(12) United States Patent
Hasegawa et al.

(10) Patent No.: US 7,844,980 B2
(45) Date of Patent: Nov. 30, 2010

(54) OPTICAL DISC DEVICE HAVING REDUCED STRIKING SOUND

(75) Inventors: Kazunori Hasegawa, Kanagawa (JP); Tsukasa Nakayama, Kanagawa (JP); Hiroto Nishida, Ishikawa (JP); Isamu Nakade, Ishikawa (JP); Kenji Urushihara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 688 days.

(21) Appl. No.: 11/814,399

(22) PCT Filed: Jan. 19, 2006

(86) PCT No.: PCT/JP2006/300743

§ 371 (c)(1),
(2), (4) Date: Jul. 20, 2007

(87) PCT Pub. No.: WO2006/077925

PCT Pub. Date: Jul. 27, 2006

(65) Prior Publication Data

US 2009/0007166 A1     Jan. 1, 2009

(30) Foreign Application Priority Data

Jan. 20, 2005     (JP)     ............................. 2005-013186

(51) Int. Cl.
*G11B 17/04*     (2006.01)
(52) U.S. Cl. ..................................................... 720/624
(58) Field of Classification Search ................. 720/623, 720/624
See application file for complete search history.

(56) References Cited

U.S. PATENT DOCUMENTS

| 4,695,996 A * | 9/1987 | Sugihara et al. ............. 720/623 |
| 6,288,982 B1 * | 9/2001 | Kato ....................... 369/30.36 |
| 2001/0043552 A1 | 11/2001 | Takemasa et al. |
| 2002/0057643 A1 | 5/2002 | Yoshida et al. |

FOREIGN PATENT DOCUMENTS

| JP | 61-45760 | 3/1986 |
| JP | 11-273208 A | 10/1999 |
| JP | 2000-040290 | 2/2000 |

* cited by examiner

*Primary Examiner*—David D Davis
(74) *Attorney, Agent, or Firm*—RatnerPrestia

(57) ABSTRACT

To provide an optical disc device in which the number of parts is small, and quietness can be secured with a simple mechanism. The optical disc device includes a main body having a disc insertion/removal port, and a conveying roller for conveying a disc between the disc insertion/removal port and a disc receiving position in the main body, and also includes a swinging lever which is pivotally supported at its proximal end on a supporting shaft within the main body, and has a disc arrival switch fixed thereto, and a detection lever which is pivotally supported at its proximal end on the supporting shaft, and contacts an outer periphery of the disc (which is to be received in the disc receiving position) at its distal end to operate the disc arrival switch, and when the disc is to be inserted into the disc receiving position, the detection lever is projected into the disc receiving position.

4 Claims, 12 Drawing Sheets ized, and quietness can be secured with a simple mechanism.
OPTICAL DISC DEVICE HAVING REDUCED STRIKING SOUND This application is a U.S. National Phase Application of PCT International application PCT/JP2006/300743.

TECHNICAL FIELD

The present invention relates to an optical disc device designed to reduce a striking sound due to the striking of a received disc against the device at the time of guiding and conveying the disc (inserted into the device by a conveying roller) to a disc receiving position.

BACKGROUND ART

Because of a variety of its installation places, an optical disc device such for example as an on-vehicle one is, in some cases, required to have a compact design, quietness and high operating stability for a disc detection, etc.

An optical disc device 100 of this kind will be described with reference to FIG. 12. In FIG. 12, 101 denotes a box-like main body of a box-shape, and a disc insertion port is formed in a front panel 101A of this box-like main body 101. 102 denotes a roller for disc loading purposes which is provided within the box-like main body 101, and is disposed near to the disc insertion port. This roller 102 is rotated by a roller drive mechanism (not shown) so as to effect the insertion and ejection of a disc 103. 104 denotes semi-circular trays for holding discs 103, and the plurality of trays 104 are provided within the box-like main body at a corner portion thereof formed by a rear panel 101B and a right side panel 101C, and are arranged in a stack (see, for example, JP-A-2000-40290 Publication).

DISCLOSURE OF THE INVENTION

Problem that the Invention is to Solve

However, in the case of an device in which a disc can not be conveyed to a disc reception completion position by a fixed-type disc conveying roller as in the above conventional optical disc device 100, the disc is pushed into a receiving position by a spring force-applied lever after the engagement of the disc with the conveying roller is canceled. Therefore, when the disc is received, a striking sound is generated between the disc and a part of the receiving portion, and in some cases, this has been disadvantageous in quietness.

The present invention has been made in order to solve the conventional problem, and its object is to provide an optical disc device in which the number of parts is small, and quietness can be secured with a simple mechanism.

Means for Solving the Problem

An optical disc device of the present invention includes a main body having a disc insertion/removal port, a conveying roller for conveying the disc between the disc insertion/removal port and a disc receiving position in the main body, a swinging lever which is pivotally supported at its proximal end by a supporting shaft within the body, and to which a disc arrival switch is fixed, and a detection lever which is pivotally supported at its proximal end on the supporting shaft, and contacts an outer periphery of the disc which is to be received in the disc receiving position at its distal end to operate the disc arrival switch, and when the disc is to be inserted into the disc receiving position, the detection lever is projected into the disc receiving position.

With this construction, the disc released from restraint by the conveying roller is moved to the disc receiving position while pushing the detection lever. Therefore, the disc will not strike against parts of the receiving portion, and a violent striking sound will not develop.

And, the optical disc device of the present invention further includes a pressing lever which is pivotally supported at its proximal end by a supporting shaft in the inside of the main body, and urges the disc which is in the process of being conveyed by the conveying roller in a direction to push the disc into the disc receiving position.

With this construction, when the disc is conveyed in the loading direction, the disc is brought into contact with the detection lever, and simultaneously with this, the pressing lever pushes the disc toward the disc receiving position, so that the disc is pushed into the disc receiving position.

Furthermore, in the optical disc device of the present invention, when the arrival of the disc which is in the process of being conveyed at the vicinity of the disc receiving position is detected by the disc arrival switch in the disc inserting operation, the detection lever and the swinging lever are moved in a direction to be retracted from the disc receiving position, with the detection lever held in contact with the disc.

With this construction, the pressing lever pushes the disc into the disc receiving position, and the disc is brought into contact with the detection lever, and the swinging lever and the detection lever make the retracting movement, and therefore the disc is loaded while being caught.

Furthermore, in the optical disc device of the present invention, when the disc arrival switch detects that the detection lever contacts with the disc in its received condition in a disc ejecting operation, the conveying roller is rotated.

With this construction, when the detection lever contacts the received disc, the disc is brought into contact with the pressing lever as a result of contact by the detection lever, and an output of the disc arrival switch changes, and in response to this signal, the conveying roller can begin to rotate in an ejecting direction

ADVANTAGE OF THE INVENTION

When it is detected that the disc has reached the position where the restraint of the disc by the conveying roller for conveying the disc from the outside of the device to the inside thereof is canceled or is about to be canceled, the disc moves to the disc receiving position while held in contact with the detection lever standing by in the vicinity of this disc, and therefore a violent striking sound due to the striking of the disc against the device at the time of receiving the disc can be prevented from occurring.

Figure 1:
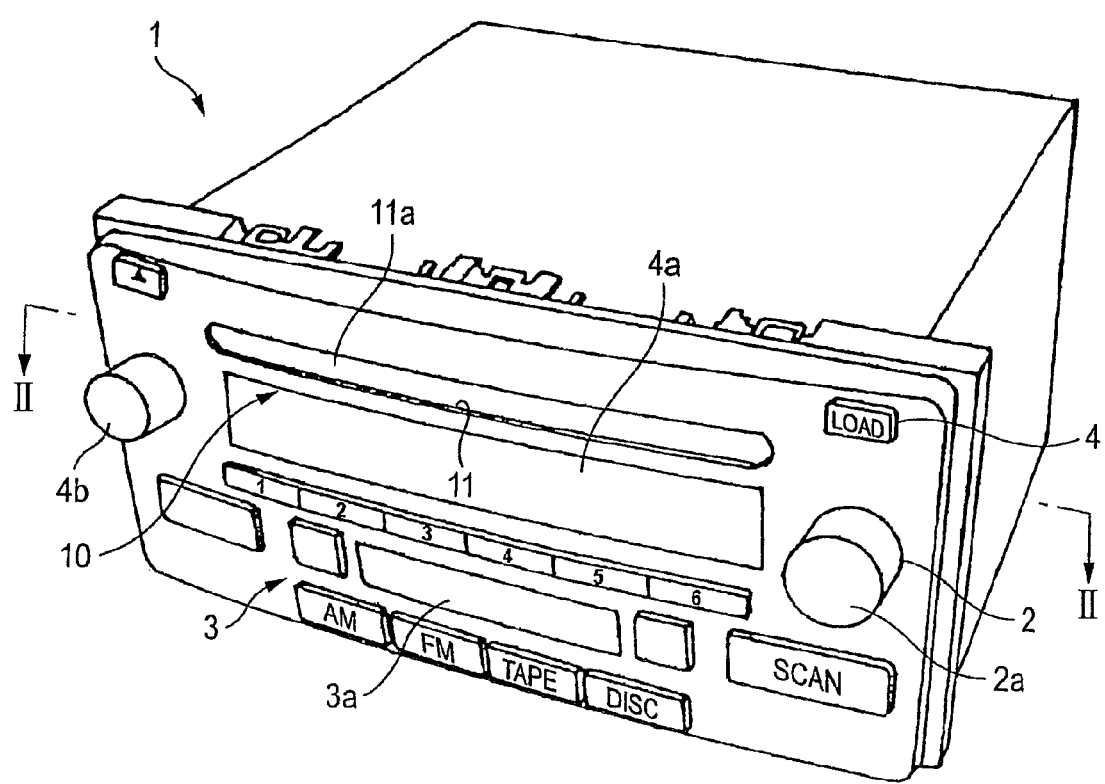
FIG. 1 A perspective view of the whole of a car audio apparatus containing an optical disc device according to an embodiment of the present invention.

DESCRIPTION OF THE REFERENCE NUMERALS AND SIGN 11 disc insertion/removal port
13 body
12 disc
14 roller member (conveying roller)
10 optical disc device
15 pushing lever
15a proximal end
17 supporting shaft
24 supporting shaft
25 swinging lever
25a proximal end
25b distal end
26 disc arrival switch
27 detection lever
27a proximal end
Dp disc receiving position

BEST MODE FOR CARRYING OUT THE INVENTION

An embodiment of an optical disc device of the present invention will hereafter be described using the drawings.

The first embodiment of the present invention is shown in FIG. 1.

FIG. 1 is a perspective view of the whole of a car audio apparatus 1 containing the embodiment of the optical disc device 10 of the present invention. This car audio apparatus 1 contains a radio 2, a cassette tape reproducing apparatus 3, etc., in addition to the optical disc device 10, and in addition to a display portion 4a and a power/volume dial 4b which are used in common for all functions, a disc insertion/removal port 11 with an openable/closable lid for the disc device 10, and a tuning dial 2a for the radio, a cassette tape insertion port 3a, etc., are provided at a front panel 4. Also, a control portion (not shown) for controlling the radio 2, the cassette tape reproducing apparatus 3, the optical disc device 10, etc., are provided in the interior.

Figure 2:
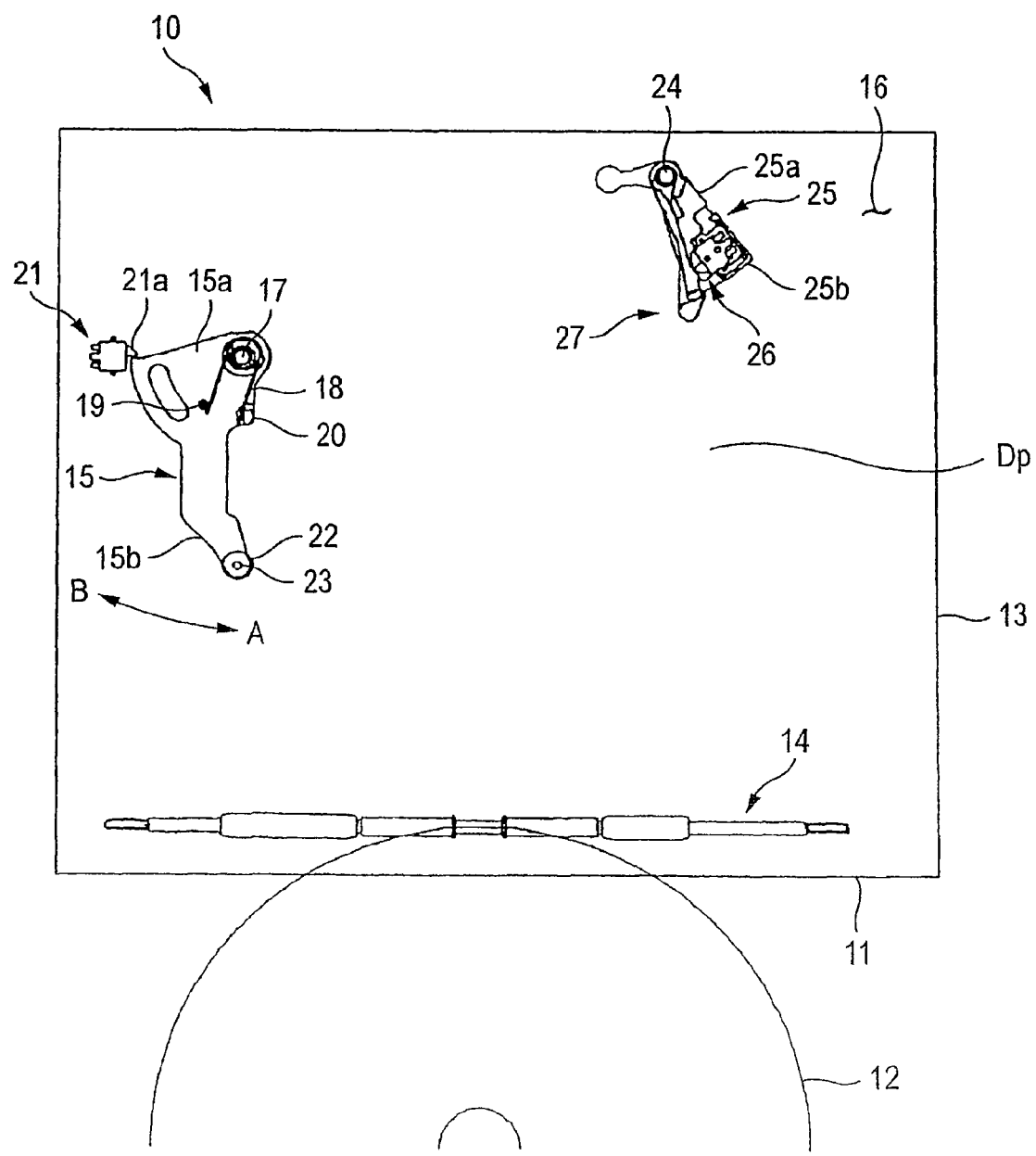
FIG. 2 A cross-sectional view of the optical disc device according to the embodiment of the invention which is contained in the car audio apparatus taken at the position II-II of FIG. 1.

FIG. 2 is a cross-sectional view of the embodiment of the optical disc device 10 of the present invention (contained in the car audio apparatus 1) taken at the position II-II of FIG. 1.

As shown in FIG. 2, the optical disc device 10 comprises a rectangular box-shaped body 13, a roller member 14 (forming a conveying roller) which is provided at that portion of this body 13 disposed near to the disc insertion/removable port 11, and contacts an inserted disc, and conveys the disc 12 by transmitting power to the roller so as to effect the insertion (loading) and discharge (ejection) of the disc 12, and a power source (not shown) for rotating the roller member 14. A conveying unit for effecting the loading and ejection is formed by the roller member 14 and an upper roller member (not shown) which is disposed in a direction perpendicular to the sheet of FIG. 2 relative to the roller member 14. The upper roller member rotates together with the roller member 14 when loading and ejecting the disc 12.

The movement of the roller member 14 in the upward-downward direction (a direction A or a direction B in the drawings) relative to the body 13 is prevented. And, the upper roller member (not shown) is movable relative to the body 13 in the upward-downward direction (in the direction perpendicular to the sheet of FIG. 2), and the upper roller member is urged in the downward direction (the direction toward the roller member 14) relative to the body 13 under the influence of a resilient member (not shown) urging the upper roller member.

Therefore, when the disc 2 is inserted into the device, the upper roller member (not shown) is moved in the upward direction (the direction away from the roller member 14) relative to the body 13, and the disc 12 is held between the roller member 14 and the upper roller member. Incidentally, the amount in which the upper roller member can be moved is more than the amount of movement effected when a plurality of (for example, two) discs are inserted, and the construction is such that even when a plurality of discs are inserted into the device, the roller member 14 and the upper roller member can rotatably press the discs so as to effect the loading and ejection.

Further, a pushing lever 15 is provided at that portion of the body 13 which is disposed near to the disc insertion/removal port 11 and is disposed inwardly of the roller member 14 in the loading direction. A supporting shaft 17 is provided in an upstanding manner at the body 13, and extends in a direction perpendicular to the surface of the disc 12 to be received in a disc receiving position Dp. The pushing lever 15 is pivotally supported at its proximal end 15a by this supporting shaft 17, and its distal end 15b can be angularly moved in directions of arrows A and B (in FIG. 2). A helical spring 18 serving as an urging unit is fitted on the supporting shaft 17, and one end of the helical spring 18 abuts against a spring engagement portion 19 formed in an upstanding manner on a base 16, and the other end thereof abuts against a spring engagement portion 20 of the pushing lever 15. With this arrangement, the pushing lever 15 is urged in the direction of arrow A. Incidentally, the pushing lever 15 abuts against a stopper (not shown) provided in an upstanding manner at the body 13 so that it is prevented from rotating in the direction of arrow A beyond a predetermined range.

The pushing lever 15 pushes the disc 12 (which is in the process of being conveyed by the roller member 14) into the disc receiving position Dp by the urging force of the spring 18 exerted in the direction of arrow A. A reception completion switch 21 is provided at that portion of the base 16 disposed near to the pushing lever 15, and the reception completion switch 21 has a contact 21a for switching an output signal between Hi (OFF) and Lo (ON). When the pushing lever 15 swings, the contact 21a contacts the proximal end 15a of the pushing lever 15, and is operated.

Namely, in a condition in which the disc 12 is not received in the disc receiving position Dp shown in FIG. 2, the contact 21a is not pressed, and the output signal of the reception completion switch 21 is Hi (OFF). On the other hand, when the disc 12 is conveyed by the roller member 14, and the pushing lever 15 is rotated in the direction of arrow B by the disc 12, the contact 21a is pressed by the distal end 15a, so that the output signal of the reception completion switch 21 becomes Lo (ON). When the disc 12 is further pushed by the pushing lever 15, and is located in a predetermined position of the disc receiving position Dp, the pushing lever 15 is again rotated in the direction of arrow A by the urging force of the spring 18, and is located at the position shown in FIG. 2, so that the output signal of the reception completion switch 21 becomes Hi (OFF).

A roller 22 is rotatably provided at the distal end 15b of the pushing lever 15 through a shaft 23, and the roller 22 serves to reduce a contact friction between the distal end 15b of the pushing lever and the disc 12.

Figure 3:
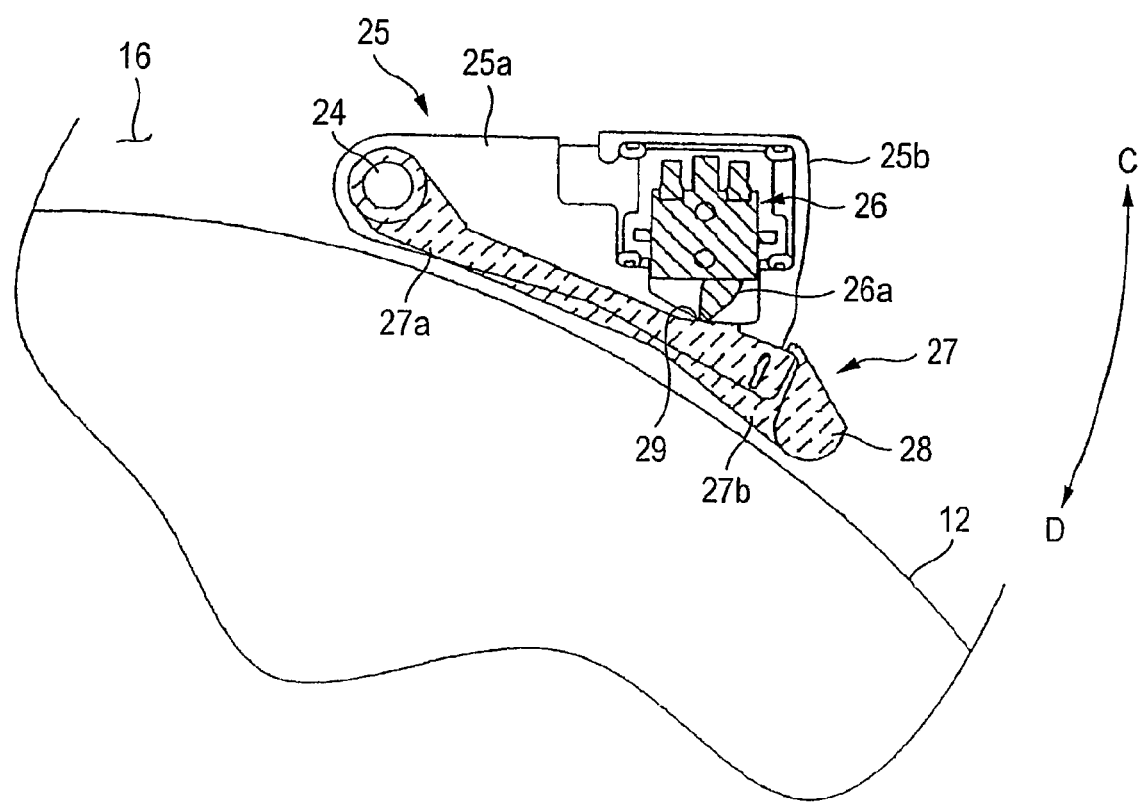
FIG. 3 An enlarged plan view of a swinging lever and a detection lever which are provided inwardly of a disc receiving position in a disc inserting direction.
Figure 4:
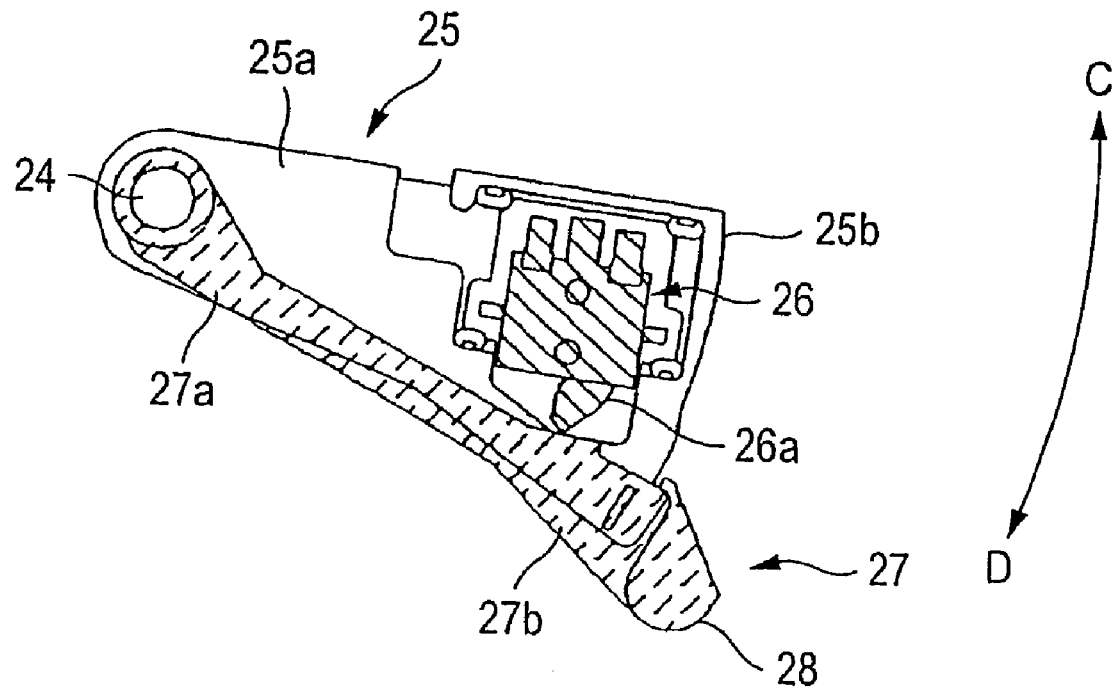
FIG. 4 An enlarged plan view of the swinging lever and the detection lever, showing a condition in which a disc is absent from a disc detection portion.

FIG. 3 is an enlarged plan view of a swinging lever and a detection lever which are provided inwardly of the disc receiving position in the disc inserting direction, and FIG. 4 is an enlarged plan view of the swinging lever and the detection lever, showing a condition in which a disc is absent from a disc detection portion.

A supporting shaft 24 is provided in an upstanding manner at that portion of the base 16 disposed inwardly of the disc receiving position Dp in the disc inserting direction, and extends in a direction perpendicular to the surface of the disc 12 to be received in the disc receiving position Dp. The swinging lever 25 is pivotally supported at its proximal end 25a on the supporting shaft 24, and a distal end 25b of the swinging lever 25 is swingable in directions of arrows C and D (in FIG. 3). A disc arrival switch 26 having a projecting contact 26a is fixedly mounted on an upper surface of the distal end 25b of this swinging lever.

The detection lever 27 is disposed on the upper surface of the swinging lever 25 in a superposed manner, and the detection lever 27 is pivotally supported at its proximal end 27a on the supporting shaft 24. A distal end 27b of this detection lever 27 is also swingable in the directions of arrow C and D (in FIG. 3). Namely, the swinging lever 25 and the detection lever 27 are supported on a common axis by the supporting shaft 24. A contact portion 28 for abutting against the outer periphery of the disc 12 is formed at the distal end 27b of the detection lever 27. Also, a pressing step portion 29 is formed at a rear portion of the detection lever 27, and when the detection lever 27 is swung in a direction toward the disc arrival switch 26, the pressing step portion 29 presses the contact 26a to operate the same. Incidentally, it is preferred that the detection lever 27 be urged by an urging unit (not shown) in such a direction (the direction of arrow D) that the distal end 27b projects into the disc receiving position Dp.

The swinging lever 25 and the detection lever 27 are swung in the directions of arrows C and D (in FIG. 3) by a lever drive system (not shown). In an initial position (shown in FIG. 3) driven by the lever drive system, contact is not made with the received disc 12, so that the received disc 12 can move upward and downward. In this condition, the detection lever 27 and the disc arrival switch 26 are not in contact with each other. Namely, the output signal of the disc arrival switch 26 is Hi (OFF).

As shown in FIG. 4, at the time of a disc detection operation, the swinging lever 25 and the detection lever 27 are rotated in the direction of arrow D (in FIG. 4) by the lever drive system (not shown). At this time, the detection lever 27 and the disc arrival switch 26 will not contact each other if the disc 12 is not present in the disc receiving position Dp. Namely, the relative position between the detection lever 27 and the disc arrival switch 26 is the same as in their initial position, and the output signal of the disc arrival switch 26 remains Hi (OFF).

On the other hand, at the time of the disc detection operation, the swinging lever 25 and the detection lever 27 are rotated in the direction of arrow D (in FIG. 4) by the lever drive system, and at this time, the detection lever 27 and the disc arrival switch 26 contact each other if the disc 12 is present in the disc receiving position Dp. As a result, the relative position between the detection lever 27 and the swinging lever 25 is changed, and the contact 26a is pressed by the pressing step portion 29 of the detection lever 27, and the output signal of the disc arrival switch 26 becomes Lo (ON). The detection of the disc 12 can be effected by these operations.

Incidentally, in the disc inserting operation, when the fact that the disc 12 in the process of being conveyed has reached the vicinity of the disc receiving position Dp is detected by the disc arrival switch 26, an operation control is effected so as to retract the detection lever 27 and the swinging lever 25 from the disc receiving position Dp. Namely, the disc arrival switch 26 is pressed and operated by the detection lever 27 swung as a result of contact of the distal end thereof with the outer periphery of the disc 12, and the lever drive system is driven in response to this operating signal, and the swinging lever 25 is further swung in the direction to be retracted from the disc receiving position Dp. Therefore, the disc 12 in the process of being conveyed is received at a low speed while held in contact with the retracting detection lever 27, so that a striking sound can be reduced.

Furthermore, in the optical disc device 10, when contact with the disc 12 (which is in the process of being conveyed) is detected by the disc arrival switch 26 in a disc ejecting operation, an operation control is effected to rotate the roller member 14.

The optical disc device 10 further comprises a disc IN switch, a pressing-completion switch, an origin switch, and the lever drive system which are not shown. The disc IN switch detects the insertion of the disc 12 into the body 13 through the disc insertion/removal port 11. The pressing-completion switch is a switch for detecting the conditions of the swinging lever 25 and detection lever 27, and detects a pressing-completion position of the swinging lever 25 and detection lever 27. Namely, a disc insertion standby condition or a disc ejection-completed condition can be detected. The origin switch is a switch for detecting the conditions of the swinging lever 25 and detection lever 27, and detects a retraction completion position (origin position) of the swinging lever 25 and detection lever 27. With this arrangement, a disc loading-completed condition or a disc ejection-initiated condition can be detected. The lever drive system can move the swinging lever 25 and the detection lever 27 to the projecting position and the retracting position relative to the disc receiving position Dp as described above.

The optical disc device 10 further comprises a spindle motor (not shown) for rotating the disc 12, an optical pickup (not shown) for the recording and reproduction of information of the disc 12, and a traverse motor for moving the optical pickup toward the inner periphery and outer periphery of the disc 12.

Next, the operation of the optical disc device 10 having this construction will be described.

Figure 5:
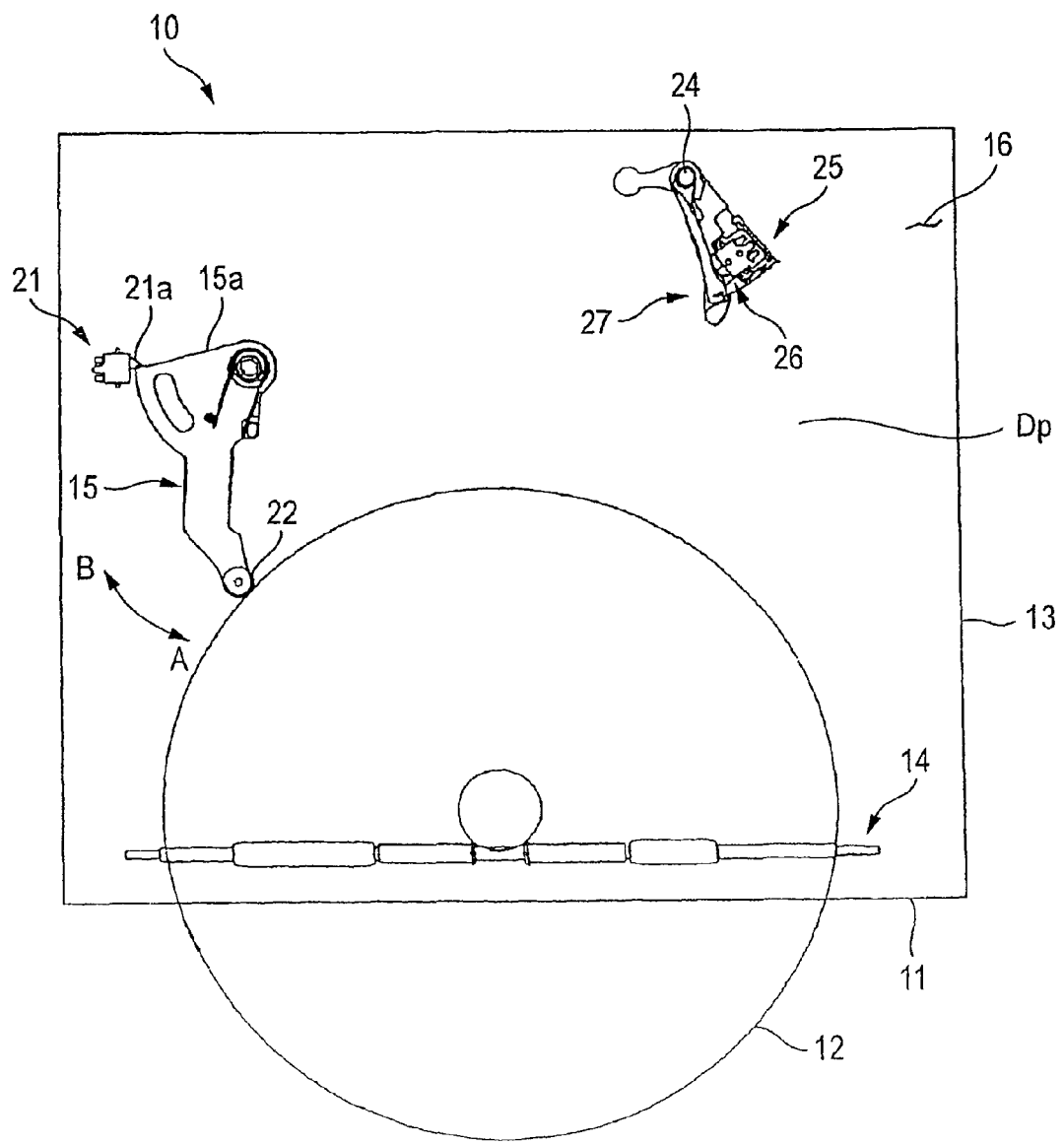
FIG. 5 A plan view of an optical disc device body, showing a condition in which the inserted disc is detected by a reception completion switch.
Figure 6:
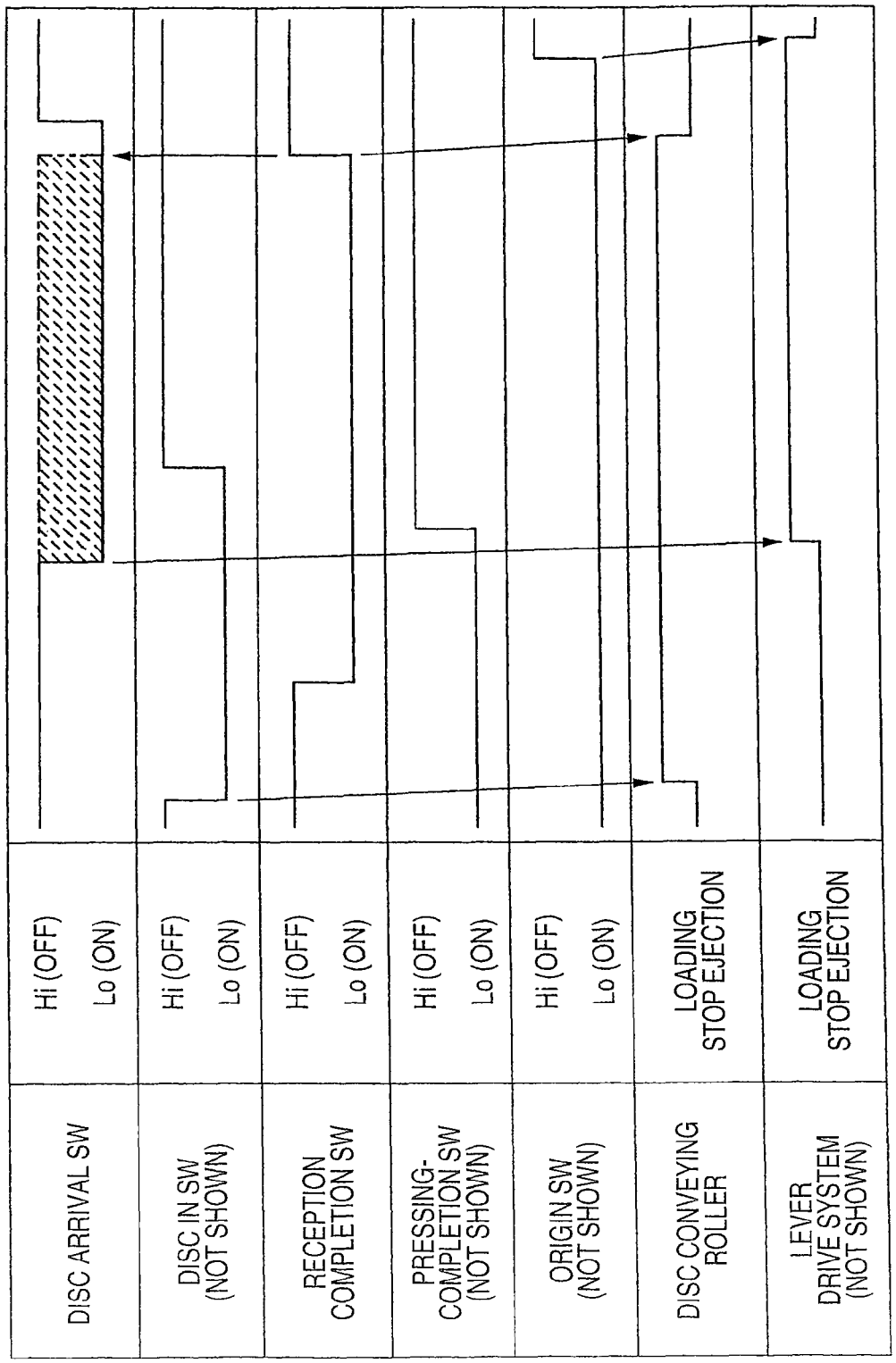
FIG. 6 A timing chart at the time of loading the disc.

FIG. 5 is a plan view of the optical disc device body, showing a condition in which the inserted disc is detected by the reception completion switch, and FIG. 6 is a timing chart at the time of loading the disc. Incidentally, the disc device of this embodiment effects the insertion and ejection of a 12-cm disc so as to effect reproduction or recording, but can also handle an 8-cm disc. In the case of effecting the reproduction or the recording of an 8-cm disc, there is used an adapter for holding the 8-cm disc on its central portion. The adapter holding the 8-cm disc is handled similarly with the 12-cm disc 12, and therefore explanation will be omitted.

(1) Loading Operation for Disc 12

When a disc 12 is inserted into the interior of the disc insertion/removal portion 11 of the body 13 (provided at the optical disc device 10) by the user, an output signal of the disc IN switch changes from Hi (OFF) to Lo (ON) as shown in FIG. 6, thus detecting the insertion of the disc 12 into the device. As a result, the disc device 10 causes the operation of the power source to be started, thereby starting the rotation of the roller member 14, that is, starting the loading.

When the automatic loading of the disc 12 is continued, so that the disc 12 further advances as shown in FIG. 5, the pushing lever 15 is rotated in the direction of arrow B by the disc 12 as shown in FIG. 5, and the contact 21a is pressed by the proximal end 15a, and the output signal of the reception completion switch 21 becomes Lo (ON).

Figure 7:
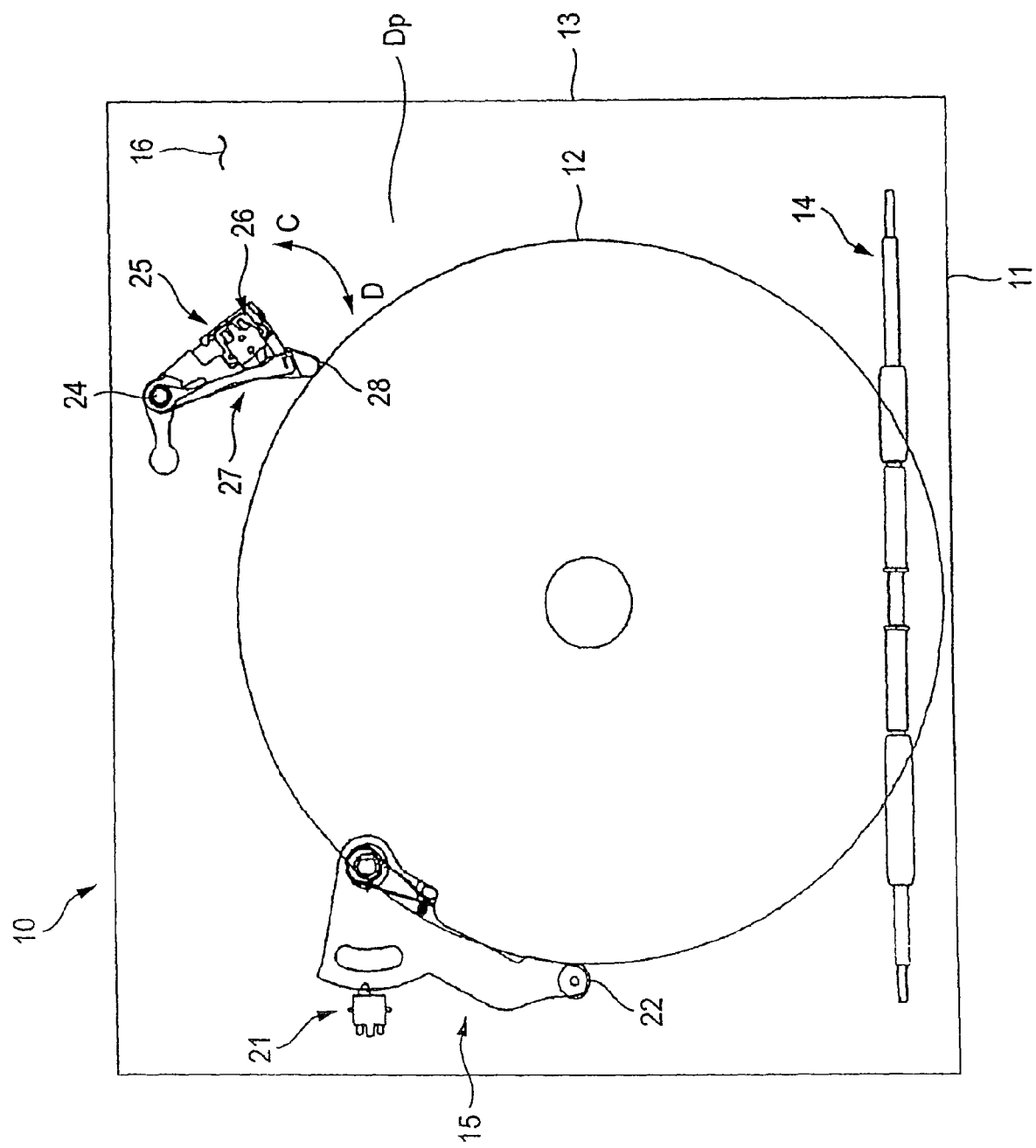
FIG. 7 A plan view of the optical disc device body, showing a condition in which the retraction of the swinging lever and the detection lever is initiated by the detection of the disc by a disc arrival switch.
Figure 8:
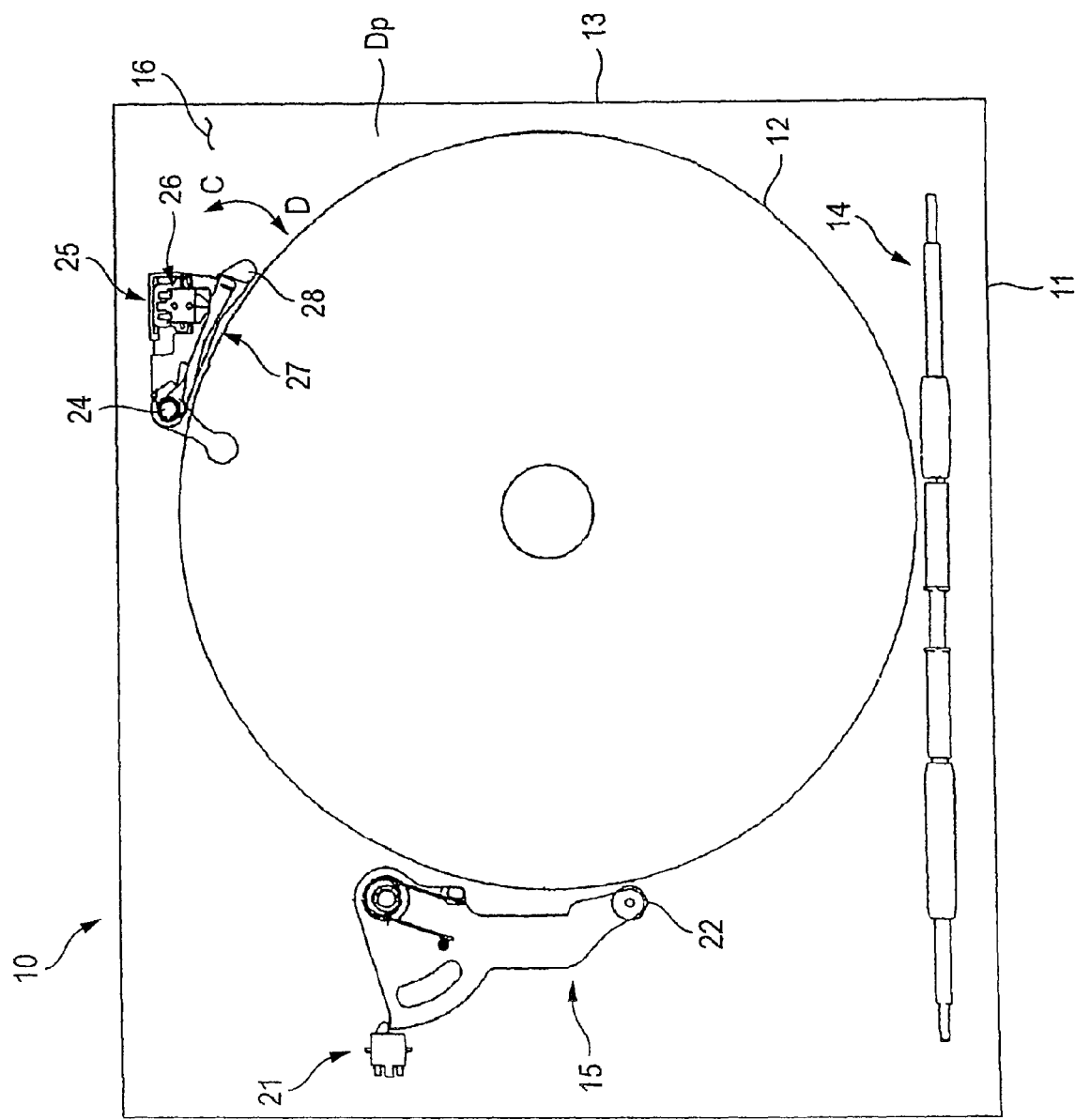
FIG. 8 A plan view of the optical disc device body, showing a condition in which the reception of the disc is completed, and the retraction of the swinging lever and the detection lever is completed.

FIG. 7 is a plan view of the optical disc device body, showing a condition in which the retraction of the swinging lever and the detection lever is initiated by the detection of the disc by the disc arrival SW, and FIG. 8 is a plan view of the optical disc device body, showing a condition in which the reception of the disc is completed, and the retraction of the swinging lever and the detection lever is completed.

As shown in FIG. 7, the swinging lever 25 and the detection lever 27 are projected into the disc receiving position Dp. This projected arrangement is effected by the lever drive system. Then, when the disc 12 is further conveyed in the loading direction, the outer periphery of the disc 12 is brought into contact with the contact portion 28 of the detection lever 27 located in a projected manner in the disc receiving position Dp. As a result, the relative position between the detection lever 27 and the swinging lever 25 is changed, and the contact 26a is pressed and operated by the pressing step portion 29 of the detection lever 27, so that the output signal of the disc arrival switch 26 becomes Lo (ON) as shown in FIG. 6. Namely, the disc 12 is detected by the disc arrival switch 26.

When the detection signal of the disc 12 from the disc arrival switch 26 is inputted, the optical disc device 10 causes the driving of the lever drive system. The lever drive system rotates the swinging lever 25 and the detection lever 27 in the loading direction (the direction of arrow C in FIG. 7), and begins to drive the swinging lever 25 and the detection lever 27 toward the retracting position. At this time, the driving speed of the lever drive system is controlled to a level slightly lower than the conveying speed of the roller member 14. Therefore, the disc 12 is loaded while its outer periphery is contacted with and caught by the detection lever 27. At this time, the disc 12 is loaded while held in contact with the three members, that is, the roller member 14, the pushing lever 15 and the detection lever 27.

When the disc 12 is further conveyed in the loading direction as shown in FIG. 8, the output of the reception completion switch 21 changes to Hi (OFF) (see FIG. 6). In this condition, the roller member 14 continues to rotate in the loading direction. When the retracting operation of the swinging lever 25 and the detection lever 27 is maintained by the lever drive system, the pushing lever 15 pushes the disc 12 into the disc receiving position Dp. As a result, the pushing lever 15 abuts against the stopper (not shown), and therefore the pressing of the pushing lever 15 against the disc 12 is canceled, and the pushing lever 15 is stopped in the initial position, thus completing the reception of the disc 12.

When the lever drive system continues the retracting operation of the swinging lever 25 and the detection lever 27, the detection lever 27 is separated from the outer periphery of the disc 12 as shown in FIG. 8, and the output of the disc arrival switch 26 changes to Hi (OFF).

When the lever drive system is further rotated in the loading direction, the output of the origin switch changes to Hi (OFF). As a result, the optical disc device 10 causes the lever drive system to be stopped, thus completing the loading and the retraction of the swinging lever 25 and detection lever 27.

(2) Regarding Monitoring of Contact of Swinging Lever 25 and Detection Lever 27 with Disc 12

In the timing chart shown in FIG. 6, monitoring is effected to see whether the output of the disc arrival switch 26 remains Lo (ON) after the output of the disc arrival switch becomes Lo (ON) and during the time (a hatching portion in the timing chart) when the reception completion switch 21 is Lo (ON). If the disc arrival switch 26 becomes Hi (OFF), the operation of the lever drive system is once stopped, and when the output of the disc arrival switch 26 again becomes Lo (ON), the operation of the lever drive system is started.

Then, the disc is conveyed to a recording/reproducing position by a mechanism (not shown), and is held on the spindle motor. With this operation, the loading operation for the disc 12 is completed, and the disc device is set in a condition capable of the recording and reproduction of the disc 12.

(3) Ejecting Operation for Disc 12

Figure 9:
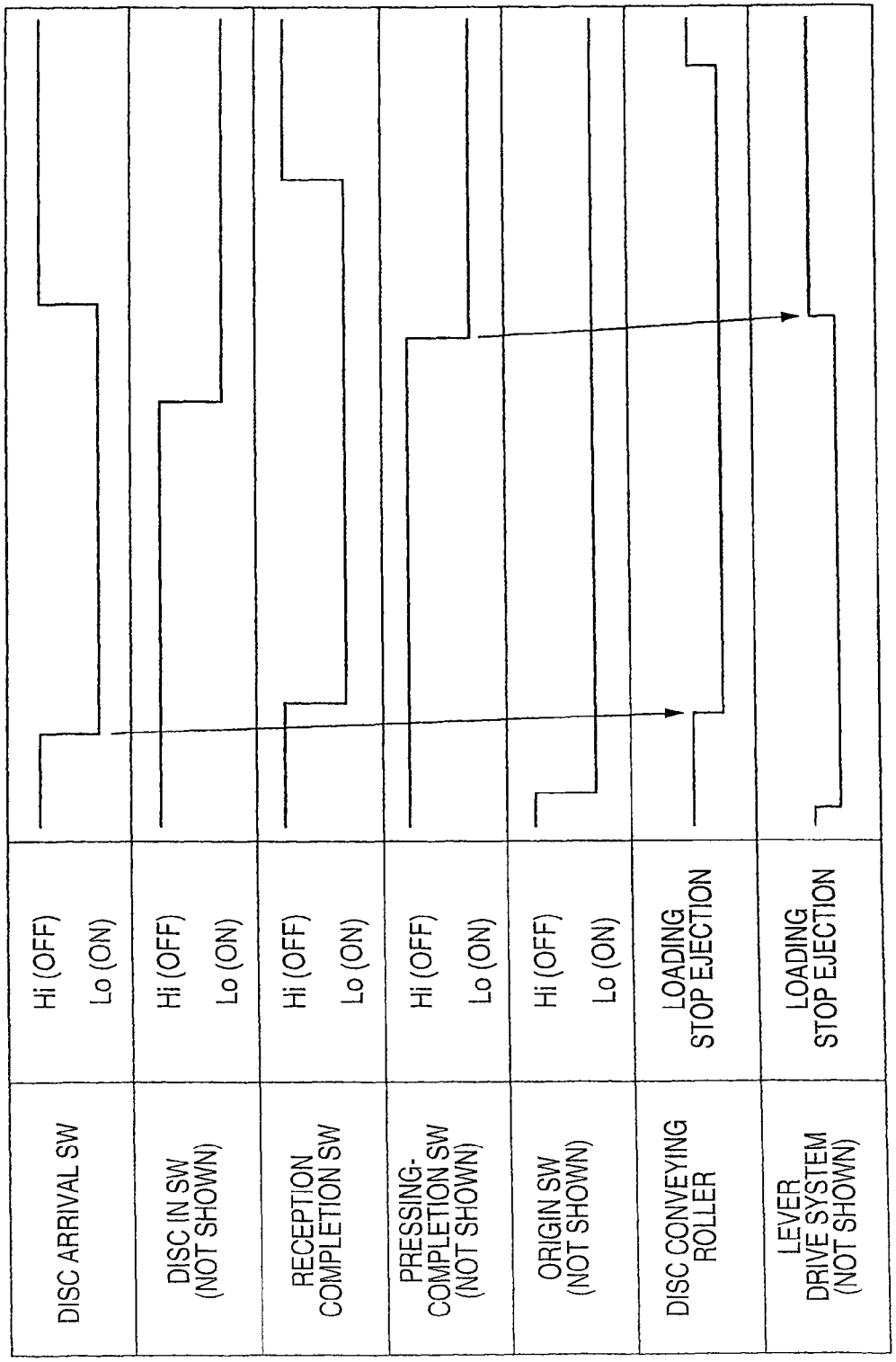
FIG. 9 A timing chart at the time of ejecting the disc.
Figure 10:
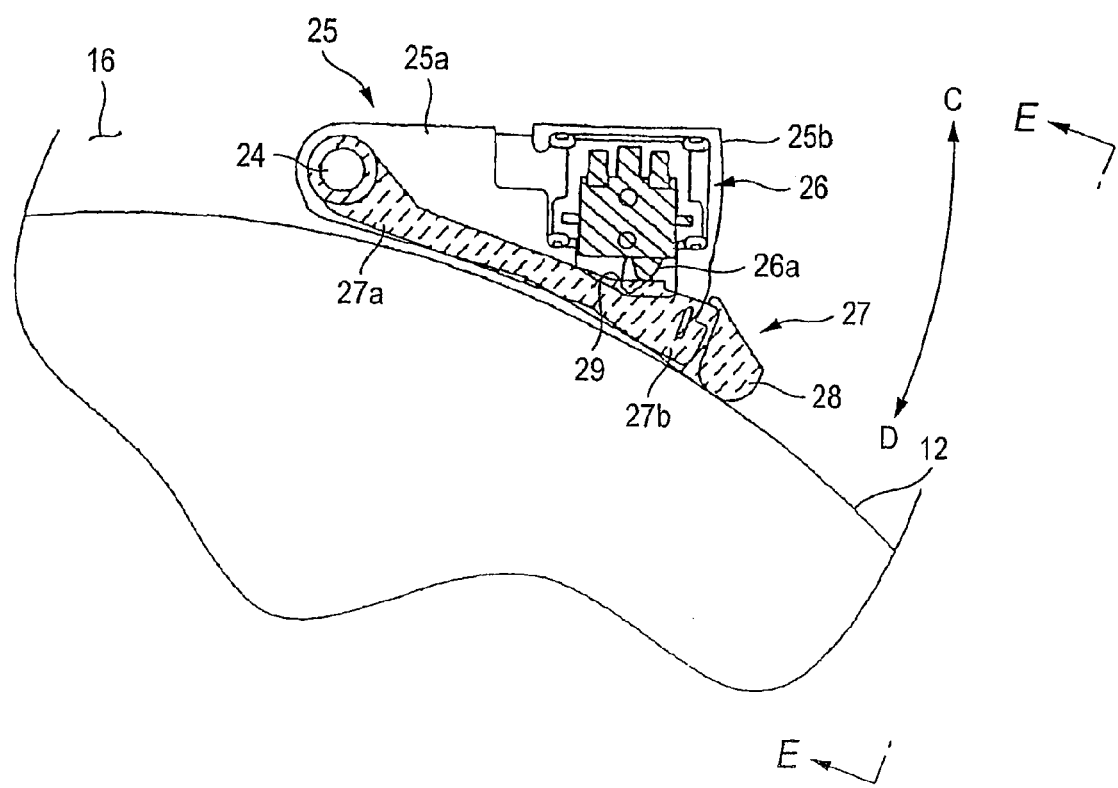
FIG. 10 A plan view of the optical disc device body, showing a condition in which the disc is present in the disc detection portion.
Figure 11:
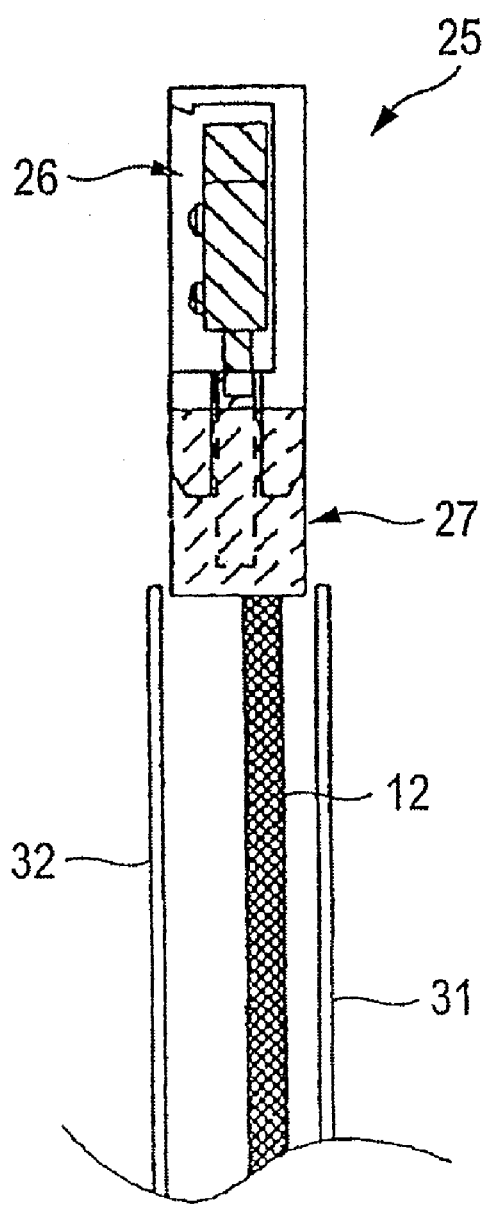
FIG. 11 A view as seen from the line E-E of FIG. 10.
Figure 12:
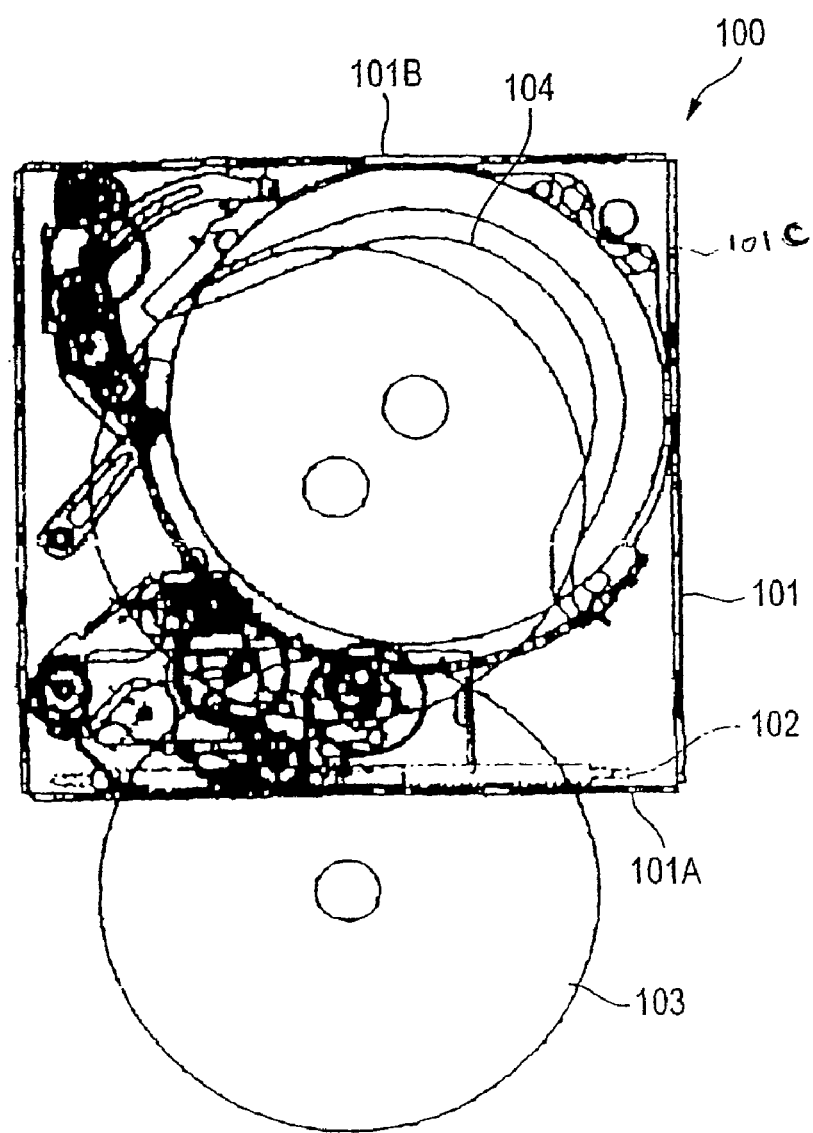
FIG. 12 A plan view of a conventional optical disc device.

FIG. 9 shows a timing chart at the time of ejecting the disc, FIG. 10 is a plan view of the optical disc device body, showing a condition in which the disc is present in the disc detection portion, and FIG. 11 is a view as seen from the line E-E of FIG. 10.

First, the holding of the disc 12 on the spindle motor is canceled by a mechanism (not shown), and the ejecting operation for the disc 12 is started. The disc 12 is conveyed in an ejecting direction by the mechanism (not shown).

As shown in FIGS. 10 and 11, when the lever drive system is rotated in the ejecting direction (the direction of arrow D in FIG. 10), the detection lever 27 is brought into contact with the disc by the lever drive system, so that the disc 12 is brought into contact with the lever 15, and the output of the disc arrival switch 26 changes to Lo (ON) (see FIG. 9). In response to this signal, the roller member 14 is rotated in the ejecting direction (see FIG. 9).

The roller member 14 and the upper roller member hold the disc 12 therebetween, and convey it in the ejecting direction. When the lever drive system is further rotated in the ejecting direction, the output of the pressing-completion switch (not shown) changes, thereby stopping the lever drive system, and the disc 12 is further conveyed in the ejecting direction by the roller member 14 and the upper roller member. At this time, the conveyance of the disc 12 to the ejecting position is detected by an ejection completion switch (not shown). In response to this signal, the optical disc device 10 causes the roller member 14 to be stopped, thus completing the ejection. Thus, at the time of the ejection, the initiation of the rotation of the roller member 14 is controlled by the output of the disc arrival switch 26, and by doing so, the time of rotation of the motor in a non-load condition is shortened so that noises of the motor can be reduced.

In this embodiment of the optical disc device 10 of the present invention, there are provided the swinging lever 25 having the disc arrival switch 26 fixed thereto, and the detection lever 27 which contacts the outer periphery of the disc 12 at its distal end to operate the disc arrival switch 26, and when inserting the disc into the disc receiving position Dp, the detection lever 27 is projected into the disc receiving position Dp. Therefore, the disc 12 released from restraint by the roller member 14 moves to the disc receiving position Dp while pushing the detection lever 27, so that a violent striking sound can be prevented from occurring. As a result, as compared with an apparatus of a construction in which a conveying roller itself is movable in a disc inserting direction, and a disc is conveyed to a receiving position by the roller, the number of the parts is smaller since those parts for moving the roller itself are not necessary, and a striking sound developing at the time of loading the disc can be reduced with the simple mechanism. And besides, at the time of the ejection, the initiation of the rotation of the roller member 14 can be controlled by the output of the disc arrival switch 26, and the time of rotation of the motor in a non-load condition can be shortened (the loading motor is not rotated more than required), and noises of the motor can be reduced.

Incidentally, in the embodiment of the present invention, although the detection lever 27 is projected into the disc receiving position Dp, the detection lever 27 may be so designed as to be projected onto a locus generated by the disc 12 during the time from the insertion of the disc 12 into the device to the conveyance of the disc to the receiving position Dp.

Furthermore, in the embodiment of the optical disc device 10 of the present invention, the swinging lever 25 and the detection lever 27 are supported on the common supporting shaft 24 so as to be pivotally moved about this supporting shaft, and the disc arrival switch 26 is operated by a change in the relative position of the swinging lever 25 and the detection lever 27. Therefore, it is not necessary to provide a construction such as a conventional one in which a pressing lever and a detection lever are provided, and the pressing lever is driven and controlled by the timing of a sensor changed during the conveyance of a disc. An error due to a delay in detection operation, etc., will not occur, and the accurate detection of whether the disc is present or absent can be effected.

Although the embodiment of the present invention has been described above, the present invention is not limited to the matters shown in the above embodiment, and in the present invention, it is well expected that those skilled in the art may change/apply the embodiment on the basis of the description of the specification and well known techniques, and these will fall within the scope to be protected.

The present Application is based on Japanese Patent Application (Patent Application No. 2005-013186), and contents thereof are incorporated herein as a reference.

INDUSTRIAL UTILITY

As described above, in the present invention, there are provided the swinging lever which is pivotally supported at its proximal end by the supporting shaft within the body, and has the disc arrival switch fixed thereto, and the detection lever which is pivotally supported at its proximal end on the supporting shaft, and contacts the outer periphery of the disc (which is to be received in the disc receiving position) at its distal end to operate the disc arrival switch, and when the disc is to be inserted into the disc receiving position, the detection lever is projected into the disc receiving position, therefore the disc released from restraint by the conveying roller moves to the disc receiving position while pushing the detection lever, and the invention has advantages that the number of the parts is small and that the striking sound developing at the time of loading the disc can be reduced, and is useful as an optical disc device and so on.

The invention claimed is:

1. An optical disc device, comprising:
   a main body which has a disc insertion/removal port;
   a conveying roller which conveys a disc between the disc insertion/removal port and a disc receiving position in the main body;
   a swinging lever which is pivotally supported at its proximal end by a supporting shaft in an inside of the main body, and to which a disc arrival switch is fixed; and
   a detection lever which is pivotally supported at its proximal end on the supporting shaft, and contacts an outer periphery of the disc, which is received in the disc receiving position, at its distal end to operate the disc arrival switch,
   wherein when the disc is received in the disc receiving position, the detection lever does not contact the disc.

2. The optical disc device according to claim 1, further comprising:
   a pressing lever which is pivotally supported at its proximal end by a supporting shaft in the inside of the main body, and urges the disc which is in the process of being conveyed by the conveying roller in a direction to push the disc into the disc receiving position.

3. The optical disc device according to claim 1, wherein when an arrival of the disc which is in the process of being conveyed at the vicinity of the disc receiving position is detected by the disc arrival switch in a disc inserting operation, the detection lever and the swinging lever are moved in a direction to be retracted from the disc receiving position, with the detection lever held in contact with the disc.

4. The optical disc device according to claim 1, wherein when the disc arrival switch detects that the detection lever contacts with the disc in its received condition in a disc ejecting operation, the conveying roller is rotated.

* * * * *